United States Patent
Degen

(10) Patent No.: US 6,799,756 B2
(45) Date of Patent: Oct. 5, 2004

(54) SUCTION CUP DEVICE WITH SPRING ACTION CLAMP CLIP

(75) Inventor: Klemens Degen, Weibern (DE)

(73) Assignee: Wolfcraft GmbH, Kempenich (DE)

( * ) Notice: Subject to any disclaimer, the term of this patent is extended or adjusted under 35 U.S.C. 154(b) by 0 days.

(21) Appl. No.: 10/427,849

(22) Filed: Apr. 30, 2003

(65) Prior Publication Data

US 2004/0004318 A1 Jan. 8, 2004

(30) Foreign Application Priority Data

Apr. 30, 2002 (DE) ......................................... 202 06 846

(51) Int. Cl.[7] ............................................... B23Q 3/02
(52) U.S. Cl. ................................ 269/96; 269/3; 269/6; 269/21
(58) Field of Search ............................ 269/96, 3, 6, 21, 269/95; 29/278

(56) References Cited

U.S. PATENT DOCUMENTS

| | | | |
|---|---|---|---|
| 803,668 A | 11/1905 | Clendenon | |
| 2,667,678 A | 2/1954 | Hargrave et al. | |
| 2,815,777 A | 12/1957 | Iraids | |
| 3,159,370 A | 12/1964 | Rubinstein | |
| 3,685,663 A | 8/1972 | Hoeffleur | |
| 3,750,991 A | 8/1973 | Ragir | |
| 3,770,259 A | 11/1973 | Wagreich | |
| 3,779,108 A | 12/1973 | Reiter | |
| 4,580,751 A | 4/1986 | Panzer | |
| 4,813,107 A | 3/1989 | Cetrone | |
| 4,844,779 A | 7/1989 | Callahan | |
| 4,944,548 A | 7/1990 | Payne et al. | |
| D317,116 S | 5/1991 | Nimtz | |
| 5,022,291 A | 6/1991 | McBain | |
| D322,390 S | 12/1991 | Nimtz et al. | |
| 5,106,177 A * | 4/1992 | Dolasia | 359/876 |
| D350,892 S | 9/1994 | Sorensen | |
| 5,381,989 A | 1/1995 | Jackson | |
| 5,448,463 A | 9/1995 | Leen | |
| 5,485,988 A | 1/1996 | Nobilee | |
| 5,645,254 A | 7/1997 | Ng et al. | |
| 5,765,820 A | 6/1998 | Marusiak | |
| 5,772,468 A | 6/1998 | Kowalski et al. | |
| 5,791,210 A * | 8/1998 | Wolff et al. | 81/302 |
| 5,820,116 A | 10/1998 | Haese | |
| 6,106,183 A | 8/2000 | Strässle et al. | |
| 6,175,998 B1 | 1/2001 | Leo | |
| 6,240,815 B1 | 6/2001 | Huang | |
| 6,257,039 B1 | 7/2001 | Childress | |
| 6,336,386 B1 | 1/2002 | Lee | |

FOREIGN PATENT DOCUMENTS

| | | |
|---|---|---|
| DE | 475317 | 4/1929 |
| DE | 2 217 638 | 4/1973 |
| GB | 2 297 581 A | 8/1996 |
| WO | WO 91/12114 | 8/1991 |

* cited by examiner

*Primary Examiner*—Lee D. Wilson
(74) *Attorney, Agent, or Firm*—Bell, Boyd & Lloyd

(57) ABSTRACT

A suction-cup device has a cup-shaped support body having a cup opening and a hole. A suction diaphragm is positioned in the cup opening of the cup-shaped support body. A rod extends through the hole and is connected to the suction diaphragm. A clamp has first and second arms pivotally connected together at an articulation pin, the first and second arms each having a clamping jaw at one end and an actuating section at another end. The clamping jaws are biased toward each other. The clamp has a clamping member pivotally connected to the rod by a pivot pin which extends in a direction transverse to a direction of the articulation pin. The clamping member operatively contacts the cup-shaped support body and moves the rod and actuates the suction diaphragm when the clamping member is pivoted to a suction position. The clamping member moves the rod and releases the suction diaphragm when the clamping member is pivoted to a release suction position.

17 Claims, 4 Drawing Sheets

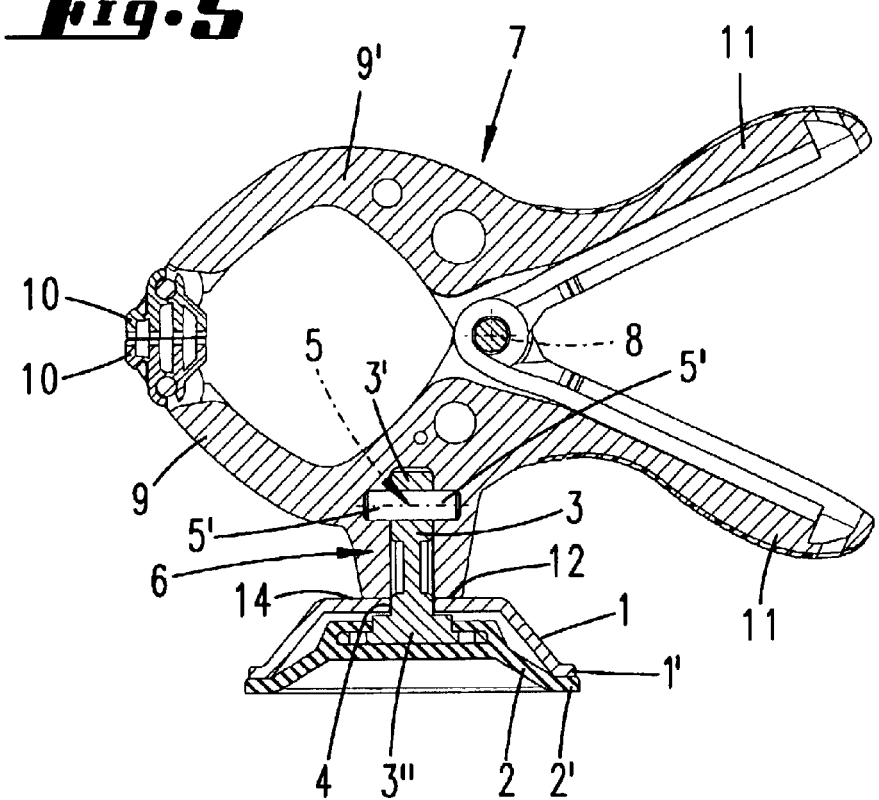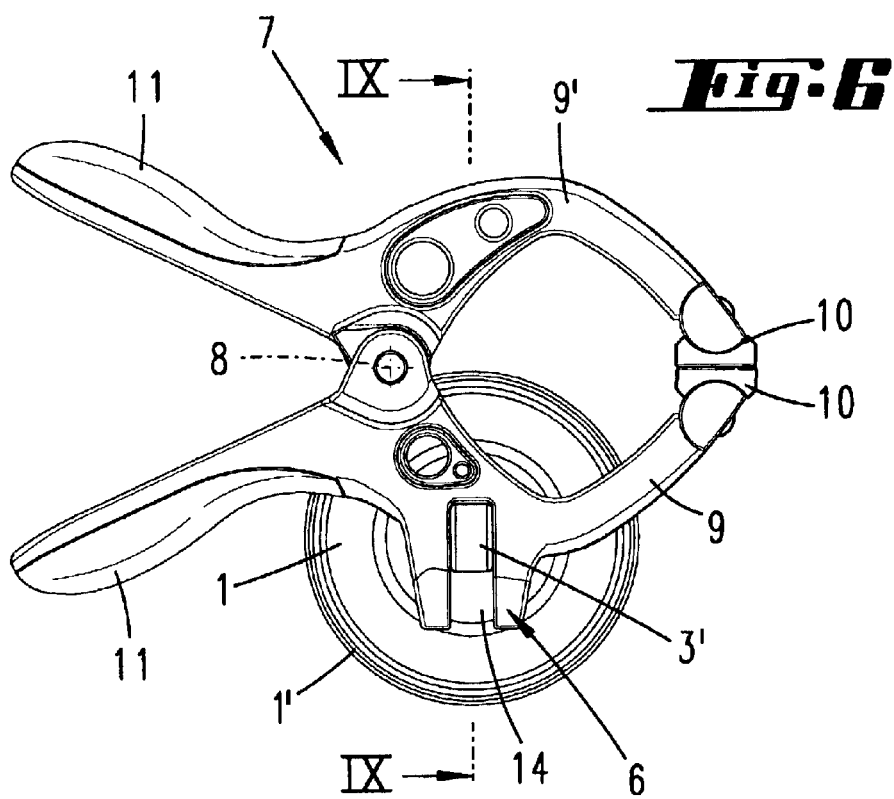

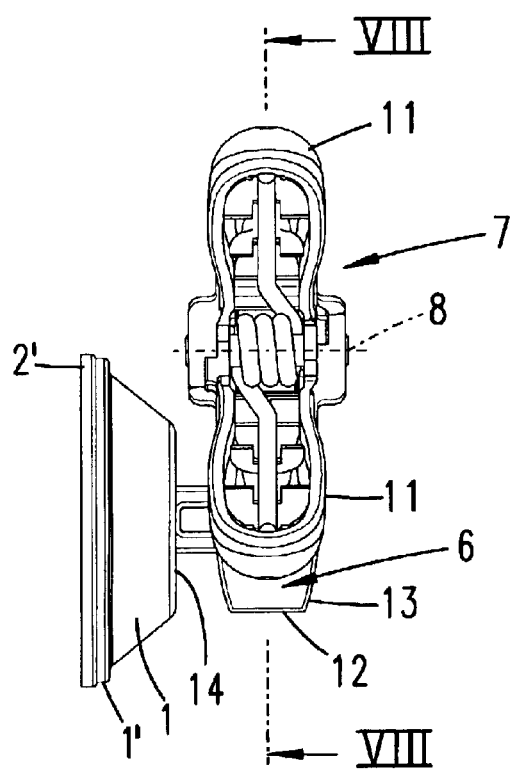
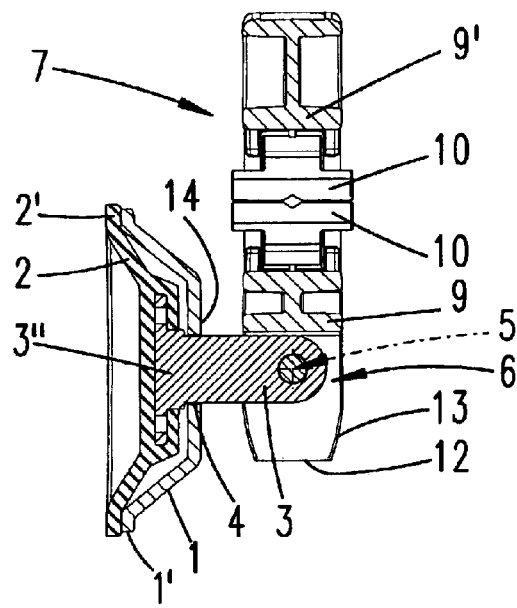

SUCTION CUP DEVICE WITH SPRING ACTION CLAMP CLIP

CROSS REFERENCE TO RELATED APPLICATION

This application claims priority of German patent application number 20206846.3, filed Apr. 30, 2002, the entire disclosure of which is incorporated herein by reference.

BACKGROUND OF THE INVENTION

The present invention relates to suction-cup devices. In an embodiment, the present invention relates to a suction-cup device having a cup-like supporting body and a suction diaphragm which is positioned in the cup opening of the supporting body. On the center of the suction diaphragm there acts a pull rod, which projects through a central opening of the supporting body by way of its free end. A clamping member which can be pivoted about a pivot pin is articulated at the free end of the pull rod. The clamping member can be pivoted about the pivot pin from a release position, via a dead-center position, into a clamping position.

An existing suction-cup device is described in DE 22 17 638 A. In that document, a hook is articulated on a pull rod, the hook forming, in the region of the point of articulation, a fork-like extension which has the function of a clamping member. In order to hang something on the hook, the pivot pin has to run in the horizontal direction.

An object of the present invention is to provide an improved suction-cup device in a functionally advantageous manner.

SUMMARY OF THE INVENTION

The object is achieved by the present invention.

In an embodiment, the present invention provides a clamping member having a spring-action clamp clip. Two arms are connected to one another such that they can be pivoted about an articulation pin and the arms have clamping jaws at one end and actuating sections at the other end. The articulation pin is positioned transversely to the pivot pin. By the two clamping jaws being opened by the two actuating sections being moved toward one another, the clamp clip can be moved into a ready-to-grip position. In order to fasten an article by means of the suction-cup device on a vertically extending wall or alternatively on a horizontal surface, the pivot pin can run vertically in order for the articulation pin to run in horizontally, so that the clamping jaws are oriented downward. In this position, to fasten the suction-cup device on the vertical surface or release it from a fastened position, the entire spring-action clamp clip has to be pivoted about the pivot pin. This is all executed about a vertically oriented axis, so that the clamping mouth of the clamp clip is always oriented downward during the clamping and release actuation. In the preferred configuration of the invention, the two arms are associated with one another in a rocker-like manner.

The actuating sections are displaced counter to the force of a spring in order to spread the clamping jaws apart from one another. This spring also applies the clamping force.

Furthermore, the clamping member may form an extension which has two surfaces located substantially perpendicularly in relation to one another and which is part of an arcuate clamping section of one of the two arms. This extension may be integrally molded on the plastics-material arm. The extension may be in the form of a truncated pyramid with a fork-like opening in which the pull rod is pivoted. The pin may be located in the center.

Furthermore, it is advantageous for a reference plane defined by the abutting clamping jaws and the articulation pin to run parallel to a fastening plane defined by the peripheral edge of the cup-like supporting body. The free end of the pull rod may be mounted in the fork opening of the extension such that the clamping member can be displaced into the release position in opposite pivoting directions. As a result, the suction-cup device can also be easily installed in the region of corners. The broad surfaces of the extension may run trapezoidally in relation to the clamping surface of the extension.

Additional features and advantages of the present invention are described in, and will be apparent from, the following Detailed Description of the Invention and the Figures.

BRIEF DESCRIPTION OF THE FIGURES

An exemplary embodiment of the invention is explained hereinbelow, with reference to accompanying drawings.

FIG. 5 shows a section along line V—V in FIG. 4.

FIG. 6 shows a plan view in the release position.

FIG. 7 shows a rear view in the release position.

FIG. 8 shows a section along line VIII—VIII of FIG. 7.

FIG. 9 shows a section along line IX—IX in FIG. 6.

DETAILED DESCRIPTION OF THE INVENTION

Figure 1:
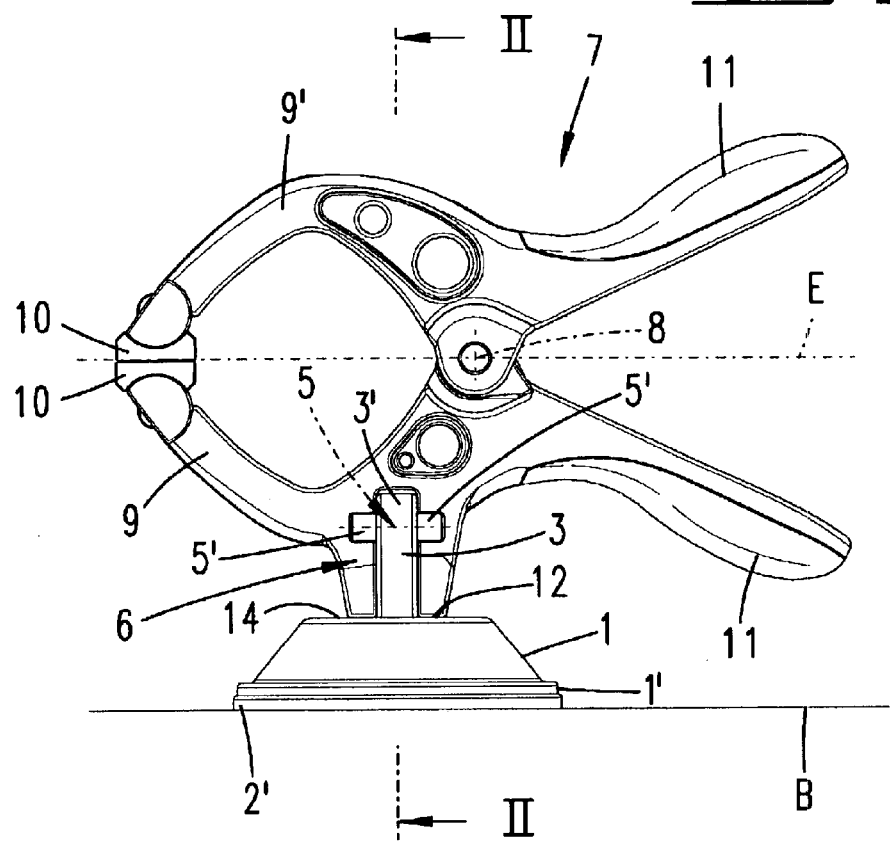
FIG. 1 shows a view of one suction-cup device according to the present invention.
Figure 2:
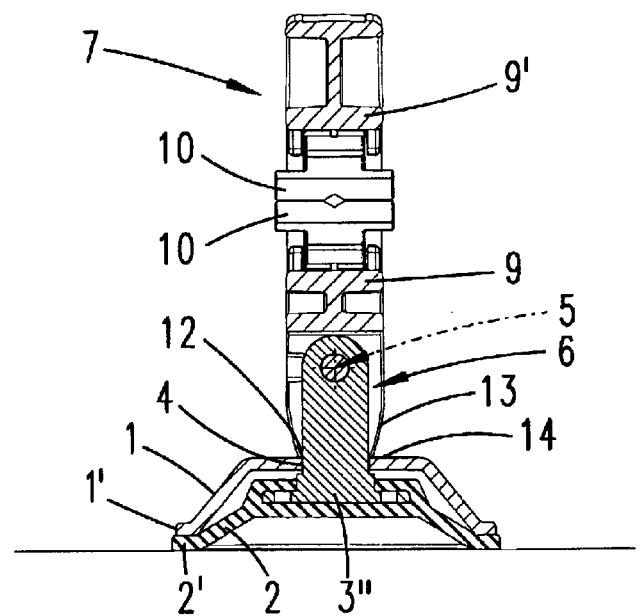
FIG. 2 shows a section along line II—II in FIG. 1.
Figure 3:
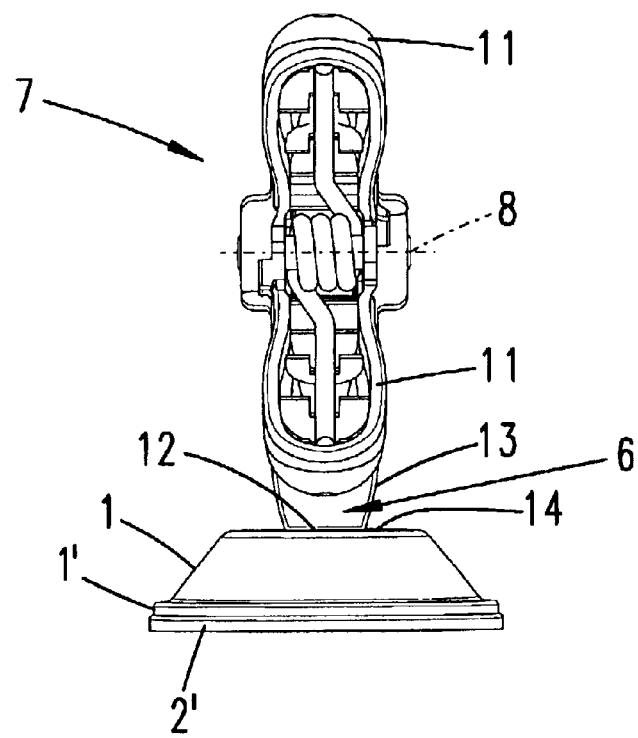
FIG. 3 shows a rear view.
Figure 4:
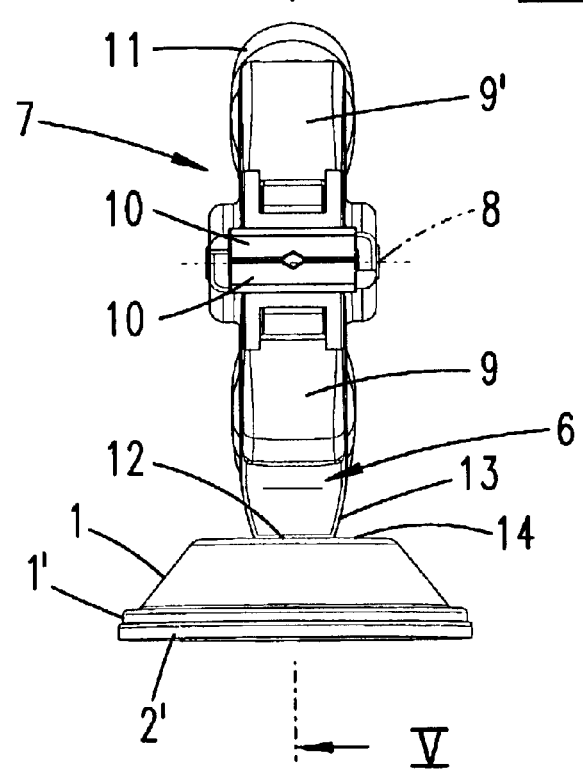
FIG. 4 shows a front view.

The suction-cup device can be fastened on a smooth, in particular vertically extending, plane by the supporting body 1, which is in the form of a cup. The borders of the cup run along a truncated cone to form an outer base surface 14, which runs parallel to the fastening plane B. A suction diaphragm 2 made of a soft plastics material is located in the cavity of the cup-like supporting body 1. The suction diaphragm 2 is likewise of cup-like configuration. The periphery 2' of the main diaphragm 2 is located beneath the peripheral edge 1' of the supporting body 1. A pull rod 3 made of a relatively hard plastics material, acts on the center of the suction diaphragm 2 by way of a first end 3". This pull rod 3 projects through an opening 4 which is located in the center of the outer base surface 14. The free section 3' of the pull rod 3, said section projecting through the opening 4, projects into a fork-like opening of a clamping member 6. The free end 3' of the pull rod 3 projects through a pin 5. The two ends 5' of the pin are mounted in the clamping member 6.

The clamping member 6 is formed by an extension of a spring-action clamp clip arm 9. The arm 9 is made of plastics material. The extension is integrally molded on the arm 9. The extension is positioned approximately between the vertex of a clamping section of the arm 9 and the articulation pin 8. On the articulation pin 8, the arm 9, which carries the extension 6, is articulated to an arm 9' of substantially the same configuration. The clamping jaws 10, which are located at one end of each arm 9, 9', are pressed against one another by means of a clamping spring (not illustrated). The other two ends of the two arms 9, 9' form actuating sections 11. If the two actuating sections 11 are pressed toward one another, the clamping mouth is opened by the two clamping jaws 10 moving away from one another.

The clamping member 6, which is formed by the extension, has two mutually opposite broad sides 13. These broad sides 13 are spaced apart from the pivot pin 5 to a lesser extent than a clamping flank 12, which connects the two broad-side surfaces 13 to one another. In a pivoting position, as is illustrated in FIGS. 6 to 9, one of the two broad sides 13 runs parallel to the outer base surface 14. This results in it being possible for the pull rod to be displaced in the direction of the periphery 1' of the supporting body, in order to achieve the release position.

In this release position, which is illustrated in FIGS. 6 to 9, the suction-cup device can be positioned on a smooth surface. By virtue of the pull rod being displaced into the opening 4, the volume between the cavity of the suction diaphragm 2 and the smooth surface is minimized. The peripheral edge 1' of the supporting body 1 presses the peripheral edge 2' of the suction diaphragm against the smooth surface. If, starting from this position, the spring-action clamp clip is pivoted about the pivot pin 5, then the connecting edge between the broad side 13 and clamping flank 12 engages against the outer base surface 14 of the supporting body 1. This edge slides on the outer base surface 14. An outward displacement of the pull rod 3 out of the opening 4 occurs. The volume between the cavity of the suction diaphragm 2 and the smooth surface is increased, so that a negative pressure is established. Once the dead-center position has been exceeded, the clamping member 6 is supported on the outer base surface 14 by way of the clamping flank 12.

In the case of the embodiment described above, the pivot pin 5 runs in the vertical direction. This results in the clamping jaws 10 being oriented downward. The plane E defined by the clamping jaws 10 and the articulation pin 8 runs parallel to the fastening plane B defined by the peripheral edge 1' of the supporting body 1. The pivot pin 5 is spaced apart from the articulation pin 8. The two pins run in a skewed manner in relation to one another such that they intersect at right angles in a projection plane B.

The suction-cup device is retained on the smooth surface as a result of the above mentioned negative pressure. If an article, for example, a hand towel, is clamped between the clamping jaws 10, it is retained. If the hand towel is subjected to a downwardly directed force which is greater than the retaining force of the two clamping jaws, then the hand towel can be drawn out of the clamping position between the two clamping jaws 10. It is conceivable for the pull on the clamped-in article to take place not in the direction of the pivot pin 5, but transversely thereto in the direction of the articulation pin 8. In the case of a pull in this direction, which may correspond to the horizontal direction, it is even possible, with a sufficiently large force, for the spring-action clamp clip to be pivoted about the pivot pin 5, so that the entire suction-cup device is released from the smooth surface. This can provide an overload-prevention means.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A suction-cup device, comprising:
   a cup-shaped support body having a cup opening and a hole;
   a suction diaphragm positioned in the cup opening;
   a rod extending through the hole and connected to the suction diaphragm; and
   a clamp having first and second arms pivotally connected together at an articulation pin, the first and second arms each having a clamping jaw at one end and an actuating section at another end, the clamping jaws being biased toward each other, the clamp having a clamping member pivotally connected to the rod by a pivot pin which extends in a direction transverse to a direction of the articulation pin, the clamping member having a suction position and a release suction position pivoted about the pivot pin.

2. The suction-cup device of claim 1, wherein the clamping member operatively contacts the cup-shaped support body, the clamping member moving the rod and actuating the suction diaphragm when the clamping member is pivoted to the suction position, the clamping member moving the rod and releasing the suction diaphragm when the clamping member is pivoted to the release suction position.

3. The suction-cup device of claim 2, wherein the clamping member is positioned between a vertex of the clamp at the clamping jaws and the articulation pin.

4. The suction-cup device of claim 2, wherein a reference plane defined by the clamping jaws when abutting each other and the articulation pin is substantially parallel to a fastening plane defined by a peripheral edge of the cup-shaped support body.

5. The suction-cup device of claim 2, wherein the clamping member has a fork-shaped mounting portion, the rod pivotally mounted to the fork-shaped mounting portion such that the clamping member can be placed in the release suction position in opposite pivoting positions.

6. The suction-cup device of claim 1, wherein the clamp has a spring biasing the clamping jaws toward each other, the actuating sections of the first and second arms being movable toward each other against a biasing force of the spring to spread the clamping jaws apart from each other.

7. The suction-cup device of claim 1, wherein the clamping member is an extension of the clamp and has a clamping surface and a side surface positioned substantially perpendicularly or trapezoidally in relation to each other.

8. The suction-cup device of claim 7, wherein the extension has a pair of side surfaces positioned trapezoidally in relation to the clamping surface.

9. The suction-cup device of claim 7, wherein the clamping member is positioned between a vertex of the clamp at the clamping jaws and the articulation pin.

10. The suction-cup device of claim 7, wherein a reference plane defined by the clamping jaws when abutting each other and the articulation pin is substantially parallel to a fastening plane defined by a peripheral edge of the cup-shaped support body.

11. The suction-cup device of claim 7, wherein the clamping member has a fork-shaped mounting portion, the rod pivotally mounted to the fork-shaped mounting portion such that the clamping member can be placed in the release suction position in opposite pivoting positions.

12. The suction-cup device of claim 1, wherein the clamping member is positioned between a vertex of the clamp at the clamping jaws and the articulation pin.

13. The suction-cup device of claim 12, wherein a reference plane defined by the clamping jaws when abutting each other and the articulation pin is substantially parallel to a fastening plane defined by a peripheral edge of the cup-shaped support body.

14. The suction-cup device of claim 12, wherein the clamping member has a fork-shaped mounting portion, the rod pivotally mounted to the fork-shaped mounting portion such that the clamping member can be placed in the release suction position in opposite pivoting positions.

15. The suction-cup device of claim 1, wherein a reference plane defined by the clamping jaws when abutting each other and the articulation pin is substantially parallel to a fastening plane defined by a peripheral edge of the cup-shaped support body.

16. The suction-cup device of claim 15, wherein the clamping member has a fork-shaped mounting portion, the rod pivotally mounted to the fork-shaped mounting portion such that the clamping member can be placed in the release suction position in opposite pivoting positions.

17. The suction-cup device of claim 1, wherein the clamping member has a fork-shaped mounting portion, the rod pivotally mounted to the fork-shaped mounting portion such that the clamping member can be placed in the release suction position in opposite pivoting positions.

* * * * *